United States Patent [19]

Salter

[11] Patent Number: 5,201,892
[45] Date of Patent: Apr. 13, 1993

[54] RIVET ORIENTATING DEVICE

[75] Inventor: James R. Salter, Spring, Tex.

[73] Assignee: LTV Areospace and Defense Company, Dallas, Tex.

[21] Appl. No.: 534,133

[22] Filed: May 17, 1990

Related U.S. Application Data

[63] Continuation of Ser. No. 213,715, Jun. 30, 1989, abandoned.

[51] Int. Cl.$^5$ ............................................. B65G 47/24
[52] U.S. Cl. .................................. 198/389; 198/468.11
[58] Field of Search ..................... 198/380, 389, 468.11

[56] References Cited

U.S. PATENT DOCUMENTS

| | | |
|---|---|---|
| 1,789,722 | 1/1931 | Bardet et al. ...................... 198/389 |
| 3,367,015 | 2/1968 | Brosene, Jr. .................... 198/389 X |
| 3,474,890 | 10/1969 | Center ................................ 198/389 |
| 3,502,193 | 3/1970 | Greshaw ........................... 198/389 |

Primary Examiner—D. Glenn Dayoan
Attorney, Agent, or Firm—Arnold, White & Durkee

[57] ABSTRACT

A rivet orienting and handling device is disclosed that is capable of controllably and accurately handling rivets of different size diameters. The device includes a manifold adapted to receive rivets from a remote hopper, a body adapted to transport rivets and two rivet blocks adapted to receive and position rivets for insertion into fingers. The rivet blocks are positioned by air actuated leaf springs. The springs cause the distance between the rivet block to vary to accommodate rivets having different diameters.

4 Claims, 3 Drawing Sheets

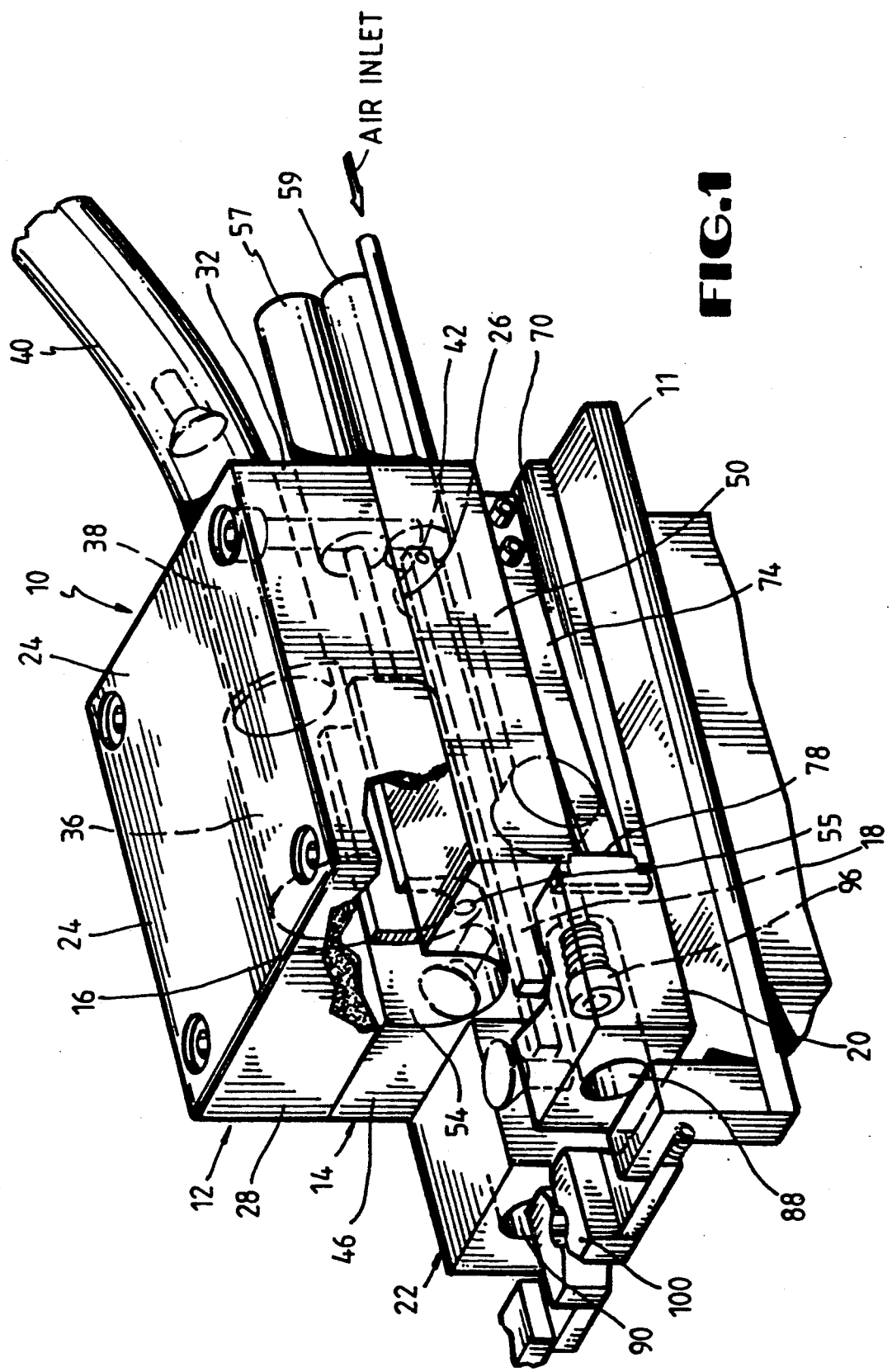

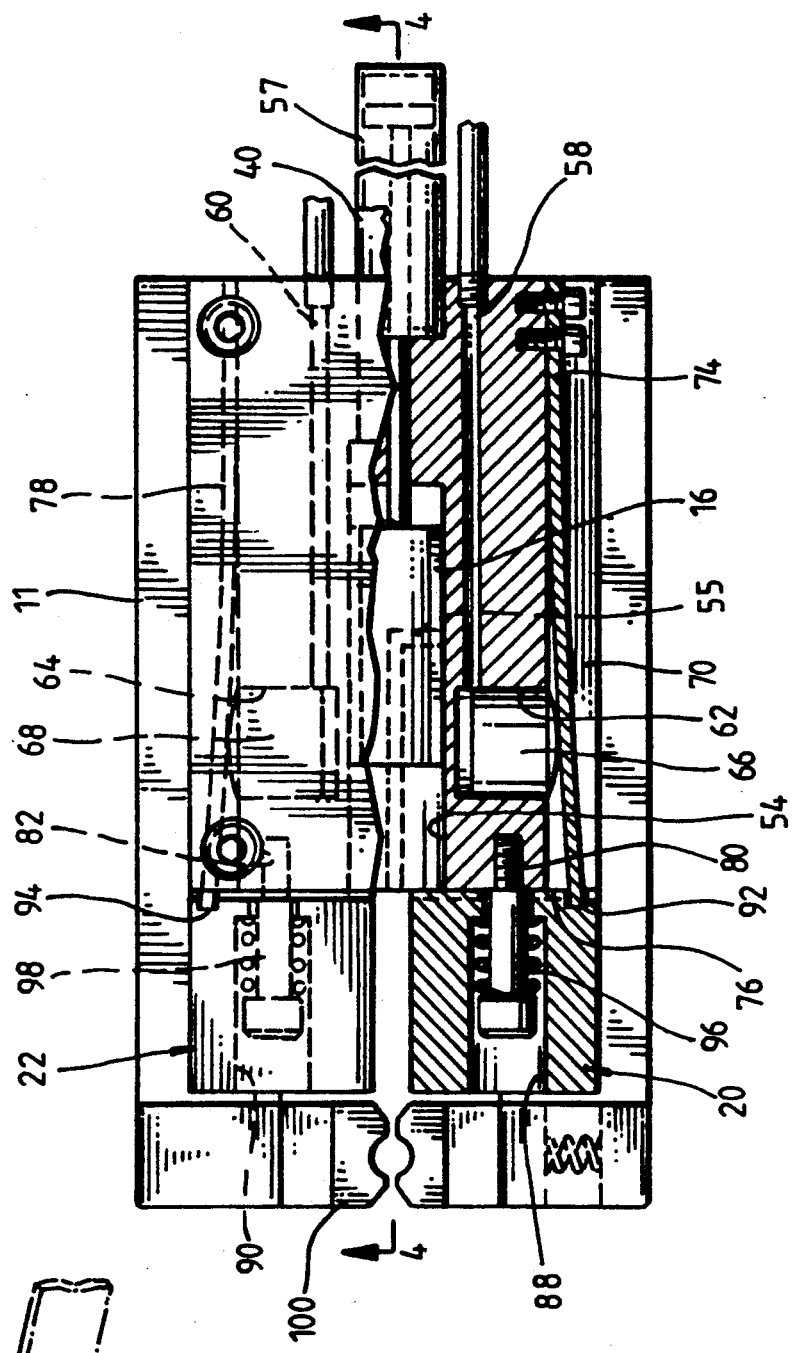
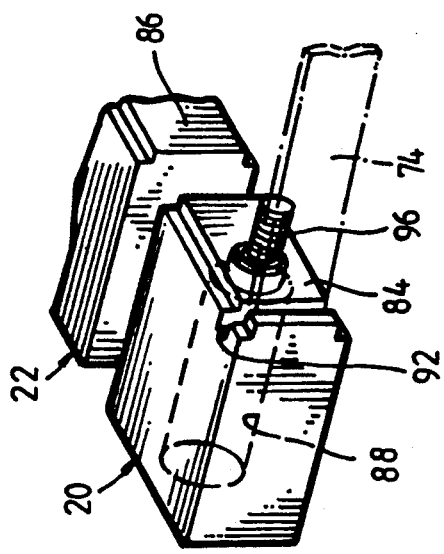

RIVET ORIENTATING DEVICE

This is a continuation of application Ser. No. 213,715, filed Jun. 30, 1989 now abandoned.

BACKGROUND OF THE INVENTION

1. Field of the Invention

The present invention relates to a rivet orienting device. More specifically, the invention relates to a device capable of controllably orienting and handling rivets having different diameters.

2. Background Art

Rivets are used in many aspects of industry to join materials. Rivets are widely used in high production manufacturing. In all high production manufacturing, time is of the essence. As such, it is important to have riveting devices that will quickly and accurately handle rivets for injection.

Presently available riveting machines include devices capable of handling rivets of different diameters. Many of the prior art devices use channels or guides to transfer rivets from a containment ("hopper") to the injector fingers.

Such riveting machines require manual adjustment of the channel before rivets of different diameters can be accommodated. These channels also have a tendency to clog or become blocked. Consequently, a need exists to provide a rivet handling device capable of quickly and accurately handling rivets of different sizes.

SUMMARY OF INVENTION

Briefly, the present invention comprises a rivet handling device. The device includes a manifold disposed on a body. The manifold includes a bore and cavity adapted to receive rivets from a chute. The body includes a trough disposed in physical communication with the manifold cavity. A shuttle is disposed in the trough and is adapted to receive rivets from the cavity. A blade is disposed in a slot in the body below the trough. Two blocks are slidably disposed on the front face of the body on each side of the trough. Each block is engaged by a separate piston actuated leaf spring assembly disposed in the body.

Operation of the invention involves the following steps. A rivet is released from a hopper, falls through the chute and into the manifold. The rivet then drops through the manifold onto the shuttle. The shuttle is retracted causing the rivet to drop into the trough. The shuttle then returns to its original position, pushing the rivet between the blocks. The blade disposed in the slot is then actuated to push the rivet into a set of riveting fingers.

Operation of present invention reduces clogging or blocking. The present invention handles rivets one at a time. The body or head of the rivet is not physically restricted during operation. Rather, rivets are allowed to fall freely in the confines of the chute into the manifold. The rivets are then pushed into position rather than held in a channel or raceway.

The gap between the blocks determines the size rivets that may be accommodated by the device. Preferably, the blocks are controllably positioned by the piston actuated leaf springs. Applying air pressure to the pistons causes the blocks to move apart increasing the gap. Exhausting air pressure causes the blocks to move together decreasing the gap. The blocks may also be adjusted by other pneumatic, mechanical, electrical or combination devices.

The adjustable block feature reduces the time required to adjust the riveting machine to handle different size rivets. At least two different size diameter rivets may be accommodated by the present invention through this feature. This adjustment is made accurately by limiting travel of the blocks in the groove.

The features of the present invention described are meant to be illustrative rather than exhaustive of the of the present invention. Other features and aspects of the present invention will become evident to those of ordinary skill in the art when reviewing the preferred embodiment in view of the drawings.

BRIEF DESCRIPTION OF THE DRAWINGS

FIG. 1 is an environmental view of the preferred embodiment of the present invention.

FIG. 2 is an isometric view of one block and a partial cutaway view of the other block of the preferred embodiment.

FIG. 3 is a partial cross-sectional top view of the preferred embodiment.

DESCRIPTION OF THE PREFERRED EMBODIMENT

Figure 4:
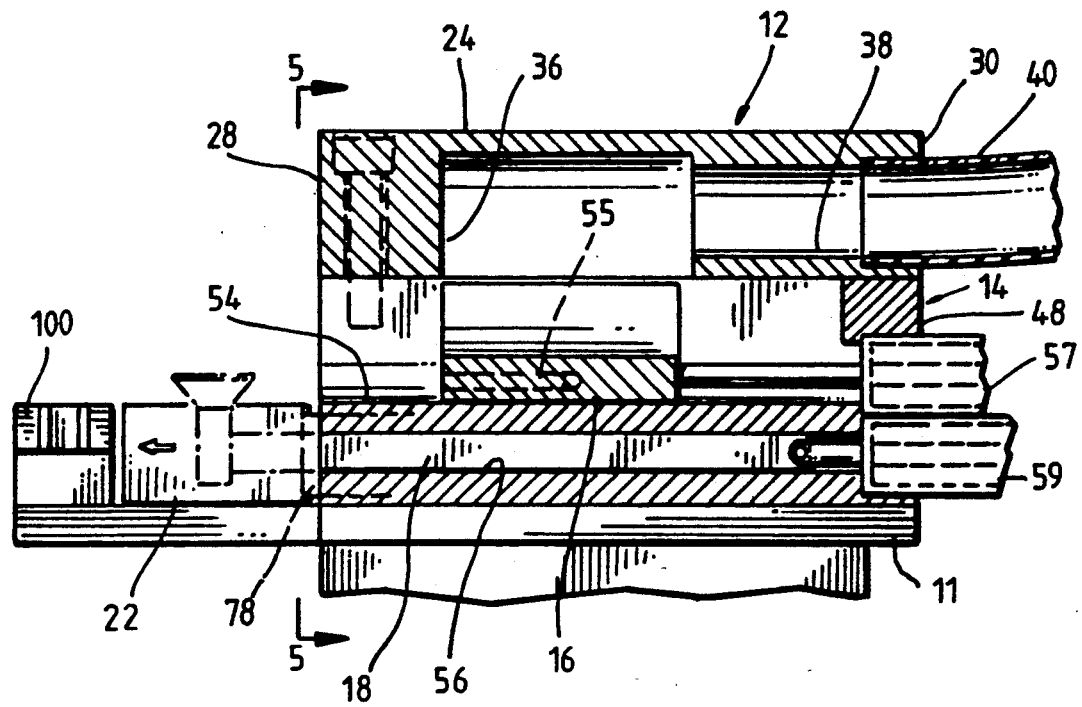
FIG. 4 is a side view of the preferred embodiment.
Figure 5:
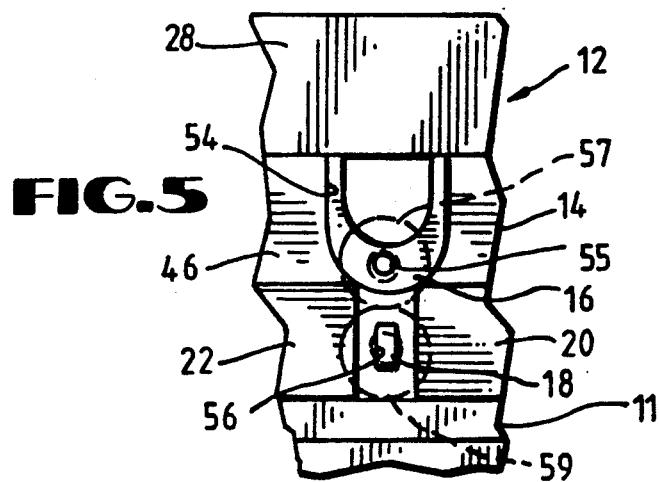
FIG. 5 is a partial frontal view of the preferred embodiment.

A rivet handling device 10, according to the present invention is shown receiving a rivet from a remote area and providing it in proper orientation to a work position. The device 10 is supported on any suitable base 11 in FIGS. 1–5. The component parts of the device 10 include a manifold 12, body 14, shuttle 16, blade 18, and blocks 20 and 22.

The manifold 12 is best shown in FIGS. 1 and 4. The manifold 12 includes a top 24, bottom 26, front 28, back 30, and sides 32 and 34. The manifold 12 defines a passageway comprising a cavity 36 and a bore 38. The cavity 36 is centrally disposed in the bottom 26. The bore 38 is disposed in the manifold 12 between the back 30 and the cavity 36. The bore 38 is in communication with a chute 40 in the back 30 to receive rivets from another location. The manifold 12 is disposed on top of the body 14.

The body 14 is best shown in FIGS. 1, 3 and 4. The body 14 includes a top 42, bottom 44, front 46, back 48, and sides 50 and 52. A trough 54 is centrally disposed in the top 42, extending from the front 46 to the back 48. The trough 54 is preferably u-shaped. The trough 54 is adapted to receive the shuttle 16 in sliding relation.

The shuttle 16 includes an air passage 55 having an inlet and an outlet. The inlet is adapted to receive a compressed air source (not shown). Preferably, an air cylinder 57 or similar motion translating device actuates shuttle 16 in the trough 54.

A slot 56 is disposed in the body 14 beneath and substantially parallel to the trough 54. The slot 56 extends from the front 46 to the back 48. The slot 56 is adapted to receive the blade 18 in sliding relation. Preferably, an air cylinder 59 or similar motion translating device actuates blade 18 in the slot 56.

Two air bores, 58 and 60, are disposed in the body 14 in substantially the same horizontal plane as slot 56. The bore 58 is disposed toward side 50, and the bore 60 is disposed toward side 52 of the body 14. Preferably, both air bores 58 and 60 extend from the back 48 partially into the body 14.

Two piston bores 62 and 64 are disposed in substantially the same plane with and substantially perpendicular to the longitudinal axis of the air bores 58 and 60 respectively. The piston bores 62 and 64 are in fluid communication with the air bores 58 and 60 respectively. The piston bores 62 and 64 are adapted to receive pistons 66 and 68 respectively.

Two spring recesses 70 and 72 are disposed in substantially the same plane as the longitudinal axis of piston bores 62 and 64. The spring recess 70 is disposed in side 50 of the body 14. The spring recess 72 is disposed in side 52 of the body 14. Preferably, the spring recesses 70 and 72 extend from the front 28 to the back 30 of body 14. The recesses 70 and 72 are adapted to receive leaf springs 74 and 76 respectively.

A groove 78 is disposed in the front 46 of the body 14. Preferably, the groove 78 is disposed in substantially the same plane with and perpendicular to the spring recesses 70 and 72. A threaded bore 80 is disposed in the groove 78 toward the side 50 of body 14. A threaded bore 82 is disposed in the groove 78 toward the side 52 of body 14.

The blocks 20 and 22 are shown in FIGS. 1-5. The blocks 20 and 22 include tongues 84 and 86, apertures 88 and 90, and grooves 92 and 94 respectively.

The tongue 84 of block 20 is disposed in sliding relation in groove 78 where the aperture 88 of block 20 is in physical communication with the threaded bore 80. The tongue 86 of block 22 is disposed in sliding relation in the groove 78 where the aperture 90 of block 22 is disposed in physical communication with the threaded bore 82.

A spring biased shoulder screw 96 is partially disposed in the aperture 88 of block 20 and threadedly disposed in the threaded bore 80. A spring biased shoulder screw 98 is partially disposed in the aperture 90 of block 22 and threadedly disposed in the threaded bore 82. The shoulder screws 96 and 98 disposed in apertures 88 and 90 limit the movement of blocks 20 and 22.

The leaf spring 74 engages the groove 92 of block 20. The leaf spring 76 engages the groove 94 in block 22.

Operation

A rivet is released from a holding area (not shown) and delivered through the chute 40 into the cavity 36. The rivet then falls onto the shuttle 16. The shuttle 16 is then drawn back by the air cylinder 57. As the shuttle moves back, the rivet engages the back of the cavity 36 causing the rivet to drop into the trough 54. Should the rivet land on its head in the trough 54, a burst of air from the compressed air source through the air passageway 55 in the shuttle 16 will force the rivet onto its side.

The shuttle 16 then returns to its original position. As shuttle 16 returns, it pushes the rivet into the gap between the rivet blocks 20 and 22. There the rivet hangs from its head. The blade 18 is then actuated to push the rivet from between the rivet blocks 20 and 22 into the work position. For example, the rivet is received by a pair of rivet fingers 100.

The present invention is capable of handling rivets of different sizes by actuating the pistons 66 and 68. Air may be supplied through air bores 58 and 60 to force pistons 66 and 68 into the leaf springs 74 and 76. The leaf springs 74 and 76 deflect outwardly causing blocks 20 and 22 to be pushed apart widening the gap. When air is exhausted through air bores 58 and 60 the leaf springs 74 and 76 deflect inwardly causing blocks 20 and 22 to be pushed together narrowing the gap.

Other mechanical, pneumatic, electric or combination systems may be incorporated to adjust the gap between the blocks 20 and 22. Such systems may include an electrically actuated mechanical screw system (not shown).

The description of the present invention is meant to be illustrative rather than exhaustive of the scope of the invention. Thus, the invention is not to be construed as limited to the preferred description or embodiment. Variations and changes may be made by those skilled in the art without departing from the spirit of the invention.

What is claimed is:
1. A rivet handling device comprising:
  a. a chute for receiving rivets;
  b. a manifold having a passageway in communication with the chute for receiving rivets from the chute;
  c. a body having a trough in communication with the passageway;
  d. a shuttle movably disposed in the trough for receiving rivets from the passageway and providing them at the end of the trough;
  e. means for reciprocally moving the shuttle in the trough;
  f. an output device having an adjustably gapped slot for receiving the rivet from the trough;
  g. means for adjusting the gap of the slot; and
  h. where the output device and means for adjusting the gap comprise:
    i. two blocks movably disposed on the front of the body that form the gapped slot where one block is disposed on each side of the trough;
    ii. two leaf spring recesses where the recesses are disposed on opposite sides of the body;
    iii. two leaf springs where one leaf spring is disposed in each of the leaf spring recesses;
    iv. one end of each leaf spring is in communication with the block disposed on the side of the body on which the leaf spring is disposed;
    v. two pistons where one piston is slidable disposed on each of the body in communication with the leaf spring disposed on the side of the body in which the piston is disposed; and
    vi. a means for actuating each piston to adjust the distance between the blocks.
2. A rivet handling device according to claim 1 where the means for actuating each piston includes a pneumatic system.
3. A rivet handling device according to claim 1 where the shuttle further includes a bore and a means for introducing air through the shuttle bore.
4. An apparatus for handling hardware having head and shank sections comprising:
  a. a body having:
    i. a top;
    ii. a front;
    iii. two sides;
    iv. a back;
    v. a bottom;
    vi. a trough disposed in the top substantially parallel to and equal distance from each side;
    vii. a slot disposed beneath the trough;
    viii. two air bores disposed inside the body where one air bore is disposed on each side of the slot;
    ix. two piston bores where one piston bore is disposed on each side of the slot and in fluid com- munication with the air bore disposed on the same side of the body;
x. a groove disposed in the front face of the body;
xi. two spring recesses disposed in the body where one recess is disposed in each side of the body in fluid communication with the piston bore disposed on the same side of the body;
b. a shuttle disposed in sliding relation in the trough;
c. a means for moving the shuttle in the trough;
d. a blade disposed in the slot;
e. a means for actuating the blade in the slot;
f. two leaf springs, where one leaf spring is substantially disposed in each of the spring recesses and partially disposed in the groove in the front face of the body;
g. two pistons where one piston is disposed inside each of the piston bores;
h. two blocks where each block comprises:
   i. an aperture;
   ii. a spring groove; and
   iii. a tongue;
i. the tongue of each block is disposed in sliding relation in the groove disposed in the front face of the body;
j. the end of each leaf spring that is disposed in the grove of the body is disposed in the spring groove of the block disposed on the same side of the body; and
k. two spring biased screws where one screw is partially disposed in each of the block apertures and partially disposed in the body.

* * * * *